United States Patent
Patil

(10) Patent No.: US 10,657,388 B2
(45) Date of Patent: May 19, 2020

(54) ROBUST SIMULTANEOUS LOCALIZATION AND MAPPING VIA REMOVAL OF DYNAMIC TRAFFIC PARTICIPANTS

(71) Applicant: HONDA MOTOR CO., LTD., Tokyo (JP)

(72) Inventor: Abhishek Narendra Patil, Sunnyvale, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 240 days.

(21) Appl. No.: 15/919,548

(22) Filed: Mar. 13, 2018

(65) Prior Publication Data

US 2019/0286915 A1   Sep. 19, 2019

(51) Int. Cl.
G06K 9/00   (2006.01)
G06K 9/62   (2006.01)
(Continued)

(52) U.S. Cl.
CPC ..... G06K 9/00791 (2013.01); G06K 9/00201 (2013.01); G06K 9/6218 (2013.01);
(Continued)

(58) Field of Classification Search
CPC ........... G06K 9/00791; G06K 9/00201; G06K 9/6218; G06K 9/00805; G06K 9/6267; G06K 9/00214; G06K 9/46; G06K 9/4642; G06K 9/0063; G06K 9/00664; G06K 9/00684; G06K 9/00691; G06K 9/00697; G06K 2209/23; G06K 2209/27;
(Continued)

(56) References Cited

U.S. PATENT DOCUMENTS 7,995,055 B1 *   8/2011   Ma .................... G06K 9/4604
                                                345/420
8,494,285 B2 *   7/2013   Zhang ................. G06T 7/162
                                                382/195
(Continued)

OTHER PUBLICATIONS

Azim, A., et al., "Detection, Classification and Tracking of Moving Objects in a 3D Environment," Intelligent Vehicles Symposium (IV), IEEE, pp. 802-807, 2012.
(Continued)

*Primary Examiner* — Michael S Osinski
(74) *Attorney, Agent, or Firm* — Arent Fox LLP

(57) ABSTRACT

A system, computer-readable medium, and method for localization and mapping for an autonomous vehicle are provided. The system may obtain an image. The system may assign labels to one or more objects of the image. The system may also obtain a point cloud. The system may determine one or more object clusters of the point cloud and associate the labels assigned to the one or more objects of the image with points of the object clusters of the point cloud. The system may further identify three-dimensional (3D) objects of the point cloud based on the labels associated with the points of the object clusters. In some aspects, the system may remove dynamic traffic participants from the point cloud based on the identified 3D objects and/or perform a simultaneous localization and mapping operation on the point cloud after removing the dynamic traffic participants.

20 Claims, 10 Drawing Sheets

(51) Int. Cl.
*G06T 7/187* (2017.01)
*G05D 1/02* (2020.01)

(52) U.S. Cl.
CPC ............ *G06T 7/187* (2017.01); *G05D 1/0251* (2013.01); *G05D 1/0274* (2013.01); *G05D 2201/0213* (2013.01); *G06K 2209/27* (2013.01); *G06T 2207/10028* (2013.01)

(58) Field of Classification Search
CPC ... G06T 7/187; G06T 7/11; G06T 7/70; G06T 2207/10028; G06T 2207/30252; G06T 2207/10016; G06T 2207/30261; G06T 17/00; G05D 1/0251; G05D 1/0088; G05D 1/0274; G05D 1/0231; G05D 1/0257; G05D 1/0221; G05D 1/024; G05D 1/0246; G05D 1/0248
See application file for complete search history.

(56) References Cited

U.S. PATENT DOCUMENTS

| | | | |
|---|---|---|---|
| 8,649,557 B2 | 2/2014 | Hyung et al. | |
| 8,649,565 B1 | 2/2014 | Kim et al. | |
| 8,798,357 B2* | 8/2014 | Sinha | G06K 9/00664 |
| | | | 345/419 |
| 9,207,069 B2* | 12/2015 | Kitamura | G01S 17/89 |
| 9,235,775 B2* | 1/2016 | Liu | G06K 9/46 |
| 9,383,753 B1* | 7/2016 | Templeton | G05D 1/0246 |
| 9,523,772 B2 | 12/2016 | Rogan et al. | |
| 9,619,716 B2* | 4/2017 | Pflug | G06K 9/00791 |
| 10,043,097 B2* | 8/2018 | Yagev | G06K 9/4647 |
| 10,078,790 B2* | 9/2018 | Wang | G06K 9/6277 |
| 10,424,065 B2* | 9/2019 | Armeni | G06T 19/00 |
| 10,491,885 B1* | 11/2019 | Hicks | G06T 17/05 |
| 10,509,413 B2* | 12/2019 | Mou | G01S 17/936 |
| 10,514,462 B2* | 12/2019 | Englard | G01S 7/417 |
| 2010/0080448 A1* | 4/2010 | Tam | H04N 13/261 |
| | | | 382/154 |
| 2012/0148162 A1* | 6/2012 | Zhang | G06T 7/11 |
| | | | 382/195 |
| 2012/0321175 A1* | 12/2012 | Hedau | G06K 9/6227 |
| | | | 382/159 |
| 2013/0101157 A1* | 4/2013 | Li | G06K 9/00805 |
| | | | 382/103 |
| 2013/0170744 A1* | 7/2013 | Hwang | G06K 9/00214 |
| | | | 382/165 |
| 2017/0307746 A1 | 10/2017 | Rohani et al. | |
| 2017/0344855 A1* | 11/2017 | Mande | G06K 9/00805 |
| 2017/0371348 A1* | 12/2017 | Mou | G06K 9/4628 |
| 2018/0188045 A1* | 7/2018 | Wheeler | G06K 9/00791 |
| 2018/0232583 A1* | 8/2018 | Wang | G06K 9/00812 |
| 2018/0365888 A1* | 12/2018 | Satzoda | G06T 7/70 |
| 2019/0026920 A1* | 1/2019 | Yi | G06T 7/579 |
| 2019/0156507 A1* | 5/2019 | Zeng | G06K 9/00201 |
| 2019/0226853 A1* | 7/2019 | Kubiak | G01C 21/32 |
| 2019/0236381 A1* | 8/2019 | Rochan Meganathan | |
| | | | G01S 7/4808 |
| 2019/0258737 A1* | 8/2019 | Wang | G06F 16/2379 |
| 2019/0271551 A1* | 9/2019 | Stess | G01S 7/4802 |
| 2019/0333237 A1* | 10/2019 | Javidnia | G06T 5/20 |
| 2019/0340746 A1* | 11/2019 | Lu | G06F 17/18 |
| 2019/0368882 A1* | 12/2019 | Wheeler | B60W 40/02 |
| 2020/0003901 A1* | 1/2020 | Shroff | G06T 17/20 |

OTHER PUBLICATIONS

Litomisky, K., et al., "Removing Moving Objects from Point Cloud Scenes," Advances in Depth Image Analysis and Applications, pp. 50-58, 2013.

Wang, C., et al., "Simultaneous Localization, Mapping and Moving Object Tracking," The International Journal of Robotics Research, 26 (9), pp. 889-916, 2007.

* cited by examiner

ROBUST SIMULTANEOUS LOCALIZATION AND MAPPING VIA REMOVAL OF DYNAMIC TRAFFIC PARTICIPANTS

BACKGROUND

Technical Field

The present disclosure relates generally to simultaneous localization and mapping, and more particularly, to robust simultaneous localization and mapping via removal of dynamic traffic participants Introduction The development of autonomous vehicles has progressed significantly due to the expansion in perception, motion planning and control, and/or emerging sensing technologies, among other factors. To achieve autonomous navigation, accurate localization and mapping may be needed. Autonomous vehicles may capture images and point clouds of an environment to assist in the localization and mapping. Autonomous vehicles perform simultaneous localization and mapping (SLAM) operations on the captured images and point clouds to build a map of the environment and obtain motion and trajectory/odometry data. SLAM operations may include one or more operations to extract, associate, estimate, and/or update localization and mapping. Often images and point clouds contain data indicating objects that are not needed for mapping of the environment and obtaining motion and trajectory/odometry data. The unnecessary objects may include dynamic traffic participants such as vehicles, pedestrians, cyclists, and animals. Inclusion of these objects during a SLAM operation may result in inaccurate or incorrect mapping and localization.

In view of the foregoing, there may be a need in the art for ways to more accurately implement localization and mapping for autonomous vehicles by way of identifying dynamic traffic participants and removing the dynamic participants prior to a SLAM operation. Further advantages and novel features will become apparent from the disclosure provided below.

SUMMARY

The following presents a summary of one or more aspects of the disclosure in order to provide a basic understanding of such aspects. This summary is not an extensive overview of all contemplated aspects, and is neither intended to identify key or critical elements of all aspects nor delineate the scope of any or all aspects. Its sole purpose is to present some concepts of one or more aspects of the disclosure in a simplified form as a prelude to the more detailed description that is presented later.

In an example, a method for localization and mapping for an autonomous vehicle is provided. The method may include obtaining, via a camera, an image acquired at a first location, assigning labels to one or more objects of the image, obtaining, via a light detector, a point cloud acquired at a second location, which is within a threshold distance of the first location, determining one or more object clusters of the point cloud, associating the labels assigned to the one or more objects of the image with points of the object clusters of the point cloud, and identifying three-dimensional (3D) objects of the point cloud based on the labels associated with the points of the object clusters. In some examples, the method may also include removing dynamic traffic participants from the point cloud based on the identified 3D objects, performing a simultaneous localization and mapping operation on the point cloud having the removed dynamic traffic participants, performing semantic segmentation to the image on a per pixel basis, associating labels of at least a portion of pixels of the image to corresponding points of the point cloud, identifying the dynamic traffic participants within the image, and/or identifying a ground plane of the point cloud and removing the ground plane from the point cloud.

In another example, a system for localization and mapping for an autonomous vehicle is provided. The system may include a camera for capturing one or more images, a light detector for capturing one or more point clouds, a memory coupled to the camera and the light detector for storing the one or more images and the one or more point clouds; and one or more processors coupled to the memory. The one or more processors may be configured to obtain, via the camera, an image acquired at a first location, assign labels to one or more objects of the image, obtain, via the light detector, a point cloud acquired at a second location, which is within a threshold distance of the first location, determine one or more object clusters of the point cloud, associate the labels assigned to the one or more objects of the image with points of the object clusters of the point cloud, and identify 3D objects of the point cloud based on the labels associated with the points of the object clusters. In some variations, the one or more processors may be further configured to remove dynamic traffic participants from the point cloud based on the identified 3D objects, perform a simultaneous localization and mapping operation on the point cloud having the removed dynamic traffic participants, perform semantic segmentation to the image on a per pixel basis, associate labels of at least a portion of pixels of the image to corresponding points of the point cloud, identify the dynamic traffic participants within the image, and/or identify a ground plane of the point cloud and remove the ground plane from the point cloud.

In another example, a computer-readable medium storing computer executable code for localization and mapping for an autonomous vehicle is provided. The computer-readable medium may comprise code for obtaining, via a camera, an image acquired at a first location, assigning labels to one or more objects of the image, obtaining, via a light detector, a point cloud acquired at a second location, which is within a threshold distance of the first location, determining one or more object clusters of the point cloud, associating the labels assigned to the one or more objects of the image with points of the object clusters of the point cloud, and identifying 3D objects of the point cloud based on the labels associated with the points of the object clusters. In some variations, the computer-readable medium may further include code for removing dynamic traffic participants from the point cloud based on the identified 3D objects, performing a simultaneous localization and mapping operation on the point cloud having the removed dynamic traffic participants, performing semantic segmentation to the image on a per pixel basis, associating labels of at least a portion of pixels of the image to corresponding points of the point cloud, identifying the dynamic traffic participants within the image, and/or identifying a ground plane of the point cloud and removing the ground plane from the point cloud.

To the accomplishment of the foregoing and related ends, the one or more aspects of the disclosure comprise the features hereinafter fully described and particularly pointed out in the claims. The following description and the annexed drawings set forth in detail certain illustrative features of the one or more aspects. These features are indicative, however, of but a few of the various ways in which the principles of various aspects can be employed, and this description is intended to include all such aspects and their equivalents.

BRIEF DESCRIPTION OF THE DRAWINGS

The novel features believed to be characteristics of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

Figure 1:
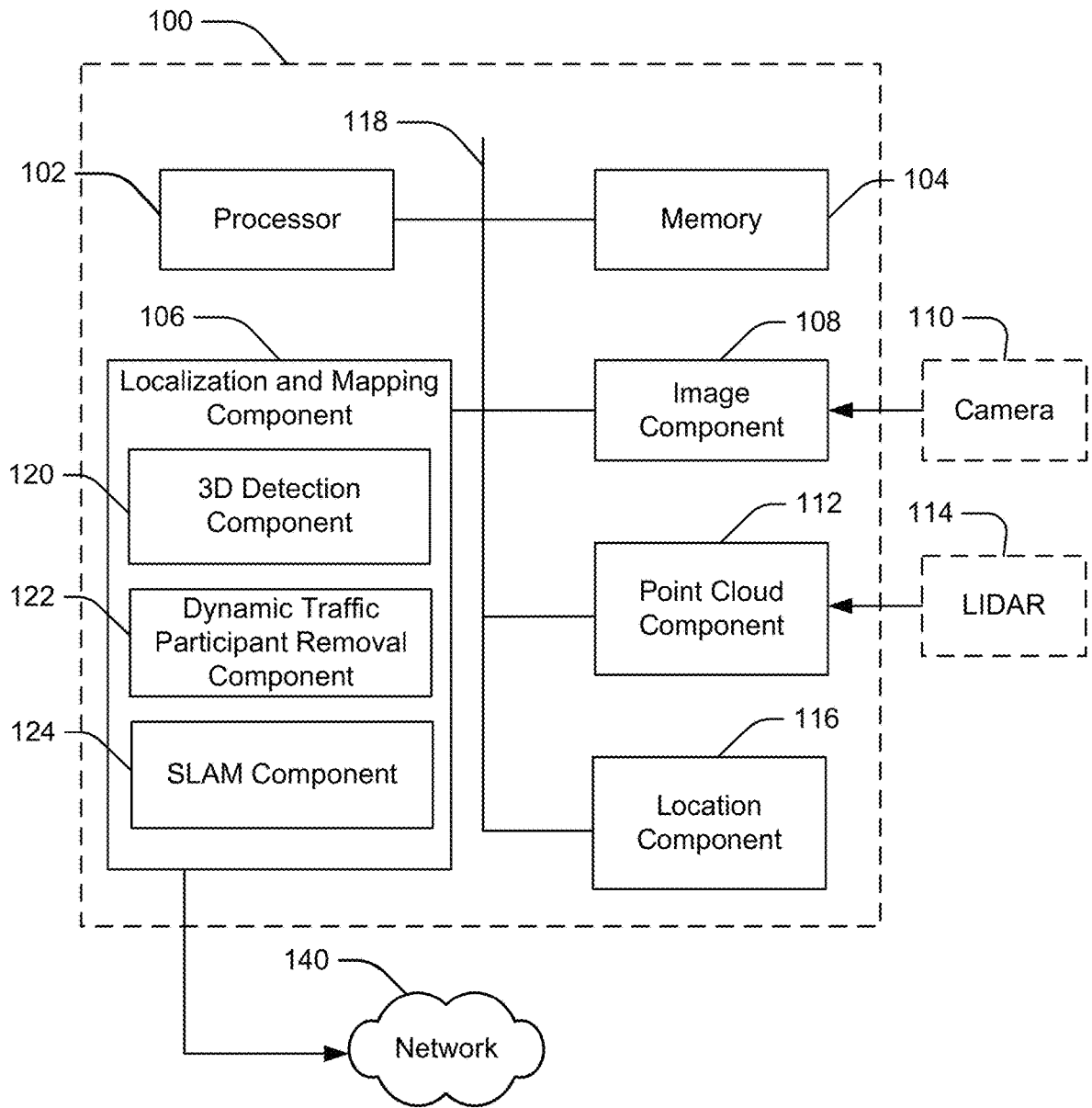
FIG. 1 illustrates a schematic view of an example of a system for localization and mapping in accordance with aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Localization and mapping for an autonomous vehicle may be generated using input from a plurality of input sources, such as an image input (e.g., from a camera) and a light sensor input (e.g., from a light detection and ranging (LIDAR) device), among other input sources. For example, the plurality of input sources may capture input and/or associate captured input at similar points in time, location, etc., such that the input may be analyzed concurrently. In a specific example, a testing device, such as a vehicle, may be equipped with a camera and a LIDAR device, and may capture images and point clouds as the vehicle moves along a route. The images and point clouds may be analyzed concurrently to generate point cloud maps and/or autonomous vehicle motion trajectory/odometry. For example, the images and point clouds may be analyzed to generate point cloud maps and/or autonomous vehicle motion trajectory/odometry. While analyzing the images and point clouds, identifying and labeling dynamic traffic participants, such as vehicles, pedestrians, cyclists, or animals, in the point cloud may be performed based on labels from the images. Further, the dynamic traffic participants may be removed from point clouds to provide more accurate results from a simultaneous localization and mapping (SLAM) operation.

The following includes definitions of selected terms employed herein. The definitions include various examples and/or forms of components that fall within the scope of a term and that can be used for implementation. The examples are not intended to be limiting.

The term "bus," as used herein, can refer to an interconnected architecture that is operably connected to transfer data between computer components within a singular or multiple systems. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

The term "memory," as used herein, can include volatile memory and/or nonvolatile memory. Non-volatile memory can include, for example, read only memory (ROM), programmable read only memory (PROM), erasable PROM (EPROM), and electrically erasable PROM (EEPROM). Volatile memory can include, for example, random access memory (RAM), synchronous RAM (SRAM), dynamic RAM (DRAM), synchronous DRAM (SDRAM), double data rate SDRAM (DDR SDRAM), and direct RAM bus RAM (DRRAM).

The term "operable connection," as used herein, can include a connection by which entities are "operably connected", is one in which signals, physical communications, and/or logical communications can be sent and/or received. An operable connection can include a physical interface, a data interface and/or an electrical interface.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, system-on-a-chip (SoC), and other suitable hardware configured to perform the various functionality described herein.

Several aspects of certain systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements can be implemented using electronic hardware, computer software, or any combination thereof. Whether such elements are implemented as hardware or software depends upon the particular application and design constraints imposed on the overall system.

By way of example, an element, or any portion of an element, or any combination of elements can be implemented with a "processing system" that includes one or more processors. One or more processors in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described can be implemented in hardware, software, firmware, or any combination thereof. If implemented in software, the functions can be stored on or encoded as one or more instructions or code on a computer-readable medium. Computer-readable media includes computer storage media. Storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

FIG. 1 shows a schematic view of an example of a system 100 for localization and mapping for an autonomous vehicle in accordance with aspects described herein. Components of the system 100, as well as the components of other systems, hardware architectures and software architectures discussed herein, can be combined, omitted or organized into different architectures for various aspects of the disclosure. However, the example aspects and configurations discussed herein focus on the system 100 as illustrated in FIG. 1, with corresponding system components and related methods.

As shown in FIG. 1, system 100 may include or be operably coupled with (or executed by) one or more processors 102 and one or more memories 104 that communicate to effectuate certain actions described herein. For example, the one or more processors 102 and/or one or more memories 104 may execute, and/or store instructions, parameters, etc., for executing, a localization and mapping component 106 for generating localization and mapping information such as a three-dimensional (3D) Point Cloud map and autonomous vehicle motion trajectory/odometry, an image component 108 for receiving one or more images (e.g., from a camera 110), a point cloud component 112 for receiving one or more point clouds (e.g., from a LIDAR 114 device), and/or a location component 116 for receiving one or more parameters related to a location of system 100 (e.g., and/or corresponding to the image and/or point cloud inputs). The processor(s) 102, memory(ies) 104, various ones of the components 106, 108, 112, 116, etc., may be operatively coupled via a bus 118. In another example, processor(s) 102 may execute one or more of the various components 106, 108, 112, 116 to perform functions described herein, while being operatively coupled to the memory(ies) 104 and/or other components via the bus 118.

In an example, the localization and mapping component 106 may include a 3D detection component 120 for detecting objects in a point cloud based on image input and point cloud input, a dynamic traffic participant removal component 122 for removing dynamic traffic participants from a point cloud, and/or a SLAM component 124 for performing a SLAM operation on the point cloud with removed dynamic traffic participants.

In an aspect, the system 100 may be employed, in full or in part, within a vehicle traveling a route. In another example, the system 100 may be distributed between a vehicle and one or more remote devices (e.g., the camera 110 or the LIDAR 114 may be present on the vehicle, while one or more components, such as the localization and mapping component 106, may be distributed on one or more remotely located computers). In this regard, for example, processing of input from the camera 110, LIDAR 114, etc., may occur on the vehicle or at a remotely located device for performing localization and mapping. In an aspect, in either case, the localization and mapping component 106 may provide localization and mapping information, such as a 3D Point Cloud map and/or the autonomous vehicle motion trajectory/odometry, to one or more other devices via a network 140 for displaying and/or further processing.

Figure 2:
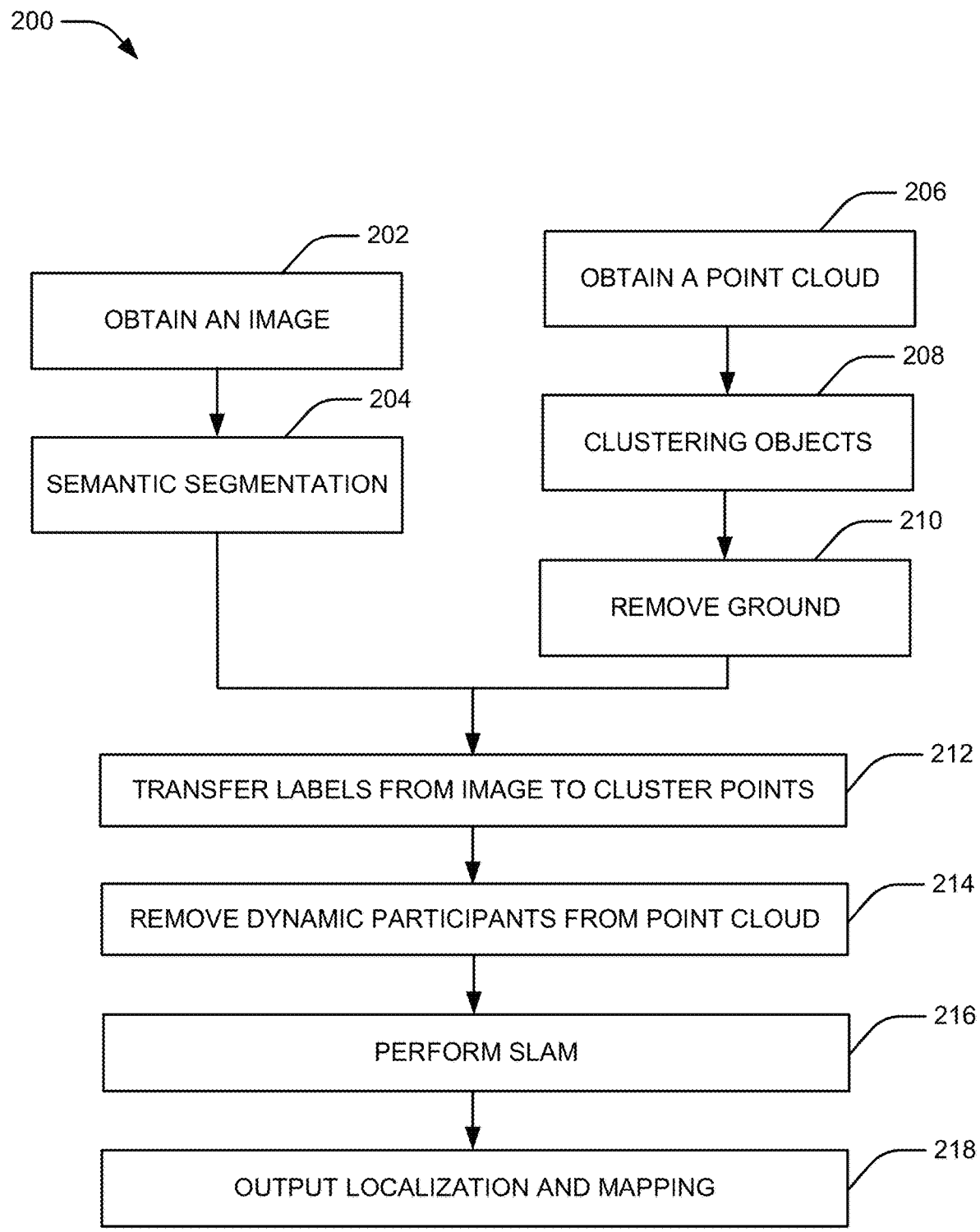
FIG. 2 illustrates a flowchart showing an example method for localization and mapping in accordance with aspects of the present disclosure.

Referring now to FIG. 2, which is described in conjunction with the example system 100 of FIG. 1, an example method 200 for localization and mapping is illustrated. In an aspect, the method 200 may be performed by the one or more processors 102 and/or the memories 104 of the system 100, which may be located in a vehicle or distributed at various locations, as described above. In this regard, one or more blocks may be performed (e.g., in full or in part) on a vehicle or at a remote location, for generating localization and mapping information.

At block 202, the method may include obtaining an image. In an aspect, image component 108 may obtain, via a camera (e.g., camera 110), the image. For example, camera 110 may be positioned on a vehicle traveling along a route, and may be configured to periodically capture images and/or to capture video at a certain number of frames per second (FPS). The camera 110 may store the images/video locally and/or in memory(ies) 104, and/or may provide the images/video to a remote device, from which the image component 108 may receive the image. In addition, for example, the location component 116 may determine a location associated with the image, which may include obtaining global positioning system (GPS) coordinates of a vehicle that includes the camera 110 at or near the time at which the image is captured by the camera 110. In an aspect, the location component 116 may associate the GPS coordinates with the image (e.g., in image metadata or otherwise in relational storage) such that the location may be determined for the image when processing the image.

In block 204, the method 200 may include performing semantic segmentation on the image. In an aspect, the localization and mapping component 106 may perform the semantic segmentation on the image. For example, the 3D detection component 120 may perform semantic segmentation on the image by applying a dilated convolutional semantic segmentation neural network to the image to associate at least a portion of the pixels with one or more semantic predictions. In an aspect, the 3D detection component 120 may apply the dilated convolutional semantic segmentation neural network Object recognition may be more accurate in the image domain (e.g., as opposed to the point cloud domain) based on a more accurate pictorial representation of the scene. Accordingly, the 3D detection component 120 may apply the dilated convolution semantic segmentation neural network to the image to output a dense pixel-wise semantic categories prediction. For example, the output from applying the semantic segmentation may appear to have similar shapes and outlines to the image where color values for the pixels are replaced with color values that correspond to a detected object based on object definitions in the semantic segmentation. Thus, for example, a semantic category corresponding to a group of pixels may be determined based on the pixel color value, and certain sizing parameters of the object may be determined or inferred based on a number of neighboring pixels corresponding to the pixel color value in a given direction. The semantic segmentation may result in an image having pixels that are labeled according to the semantic categories.

In an aspect, the semantic categories may include road, sky, sidewalk, plant, person, vehicle, and building, among other categories. In an example, the 3D detection component 120 may determine the semantic categories, which may not be accurate on a boundary of the object in the image, due in part to uncertainty as to whether the edge pixels are part of the object due to inaccuracies of the information in the semantic segmentation. Moreover, for example, applying the semantic segmentation may result in semantic categorization that is not instance specific (e.g., multiple objects having the same semantic category may be associated with the same pixel values).

At block 206, the method 200 may include obtaining a point cloud. In an aspect, the point cloud component 112 may obtain, via the light detector (e.g., the LIDAR 114), the point cloud. For example, the LIDAR 114 may be positioned on a vehicle traveling along a route, and may be configured to periodically capture point cloud scans of an area along the route. The LIDAR 114 may store the point clouds locally and/or in the memory(ies) 104, and/or may provide the point clouds to a remote device, from which the point cloud component 112 may receive the point clouds. In addition, for example, the location component 116 may determine a location associated with the point clouds, which may include obtaining global positioning system (GPS) coordinates of a vehicle that includes the LIDAR 114 at or near the time at which at least a portion of the point cloud is captured by the LIDAR 114. In an example, the location component 116 may associate the GPS coordinates with the point clouds (e.g., in point cloud metadata or otherwise in relational storage) such that the location may be determined for the point cloud when processing the point cloud for localization and mapping.

In one aspect, the location component 116 may associate the images and point clouds captured at a similar point in time with one another and/or with the corresponding location. In addition, as described further herein, the localization and mapping component 106 may obtain the image and point cloud inputs, which may be synchronized based on an associated point in time at which capturing of the image and point cloud occurred, and based on the associated location, among other factors.

At block 208, the method 200 may include determining a plurality of object clusters within the point cloud. For example, the 3D detection component 120 may determine the object clusters by organizing the point cloud into smaller portions and categorizing different portions of the point cloud. In an aspect, the 3D detection component 120 may perform clustering by using, for example, a radially bounded nearest neighbor (RBNN) cluster method, a Euclidean sense method, or a region growing segmentation method.

At block 210, the method 200 may include removing ground from the point cloud. In an aspect, the 3D detection component 120 may remove ground by removing points that have been clustered and identified as ground. For example, the 3D detection component 120 may determine the ground to be the largest planar component in the point cloud. In addition, the object clustering component 120 may remove, ignore, or otherwise avoid points in the point cloud that are determined to be planar inliers until there is no large plane (e.g., a plane that is larger than a threshold point size). For example, the 3D detection component 120 may remove, ignore, or otherwise avoid the planar inliers using random sample consensus (RANSAC) to determine the planar inliers that achieve the threshold point size.

At block 212, the method may include transferring labels from the image to the point cloud. In an aspect, the 3D detection component 120 may receive the image after having semantic segmentation performed, and the point cloud after the objects having been clustered and the ground removed. In an aspect, the 3D detection component 120 may associate at least the portion of the points that correspond to at least the portion of the pixels with the associated one or more semantic predictions. Based on the association of the pixels to the points, the 3D detection component 120 may transfer labels from the pixels of the image to associated points of the point cloud.

At block 214, the method 200 may include removing dynamic participants from the point cloud. In an aspect, the dynamic traffic participant removal component 122 may receive the labeled point cloud and remove the dynamic participants from the point cloud, based on the labels. For example, the dynamic traffic participant removal component 122 may remove points that are labeled as a person, a vehicle, or another object that is considered as a dynamic traffic participant.

At block 216, the method 200 may include performing a SLAM operation. In an aspect, the SLAM component 124 may receive the point cloud having removed dynamic participants and perform the SLAM operation on the point cloud with removed dynamic traffic participants. In an example, the SLAM component 124 may perform the SLAM operation using one or more SLAM algorithms such as Normal Distributive Transform (NDT), Iterative Closest Point (ICP), Probabilistic Iterative Correspondence (pIC), Conditional Random Fields (CRF), Local Geometric Features registration, and Branch and Bound At block 218, the method 200 may output localization and mapping based on the SLAM algorithm performed. In an aspect the SLAM component 124 may output 3D point cloud map data and/or autonomous vehicle motion trajectory/odometry data based on the SLAM algorithm.

In an example, the localization and mapping component 106 may provide the 3D point cloud map data and/or the autonomous vehicle motion trajectory/odometry data to one or more other devices via network 140. For example, the localization and mapping component 106 may upload the 3D point cloud map data and/or the autonomous vehicle motion trajectory/odometry data via network 140, and other vehicles, personal devices (e.g., cellular phones, tablets, etc.) may download the 3D point cloud map data and/or the autonomous vehicle motion trajectory/odometry data for displaying on a display of a navigation system, for augmenting or updating the 3D mapping and/or autonomous vehicle motion trajectory/odometry data, etc.

Figure 3:
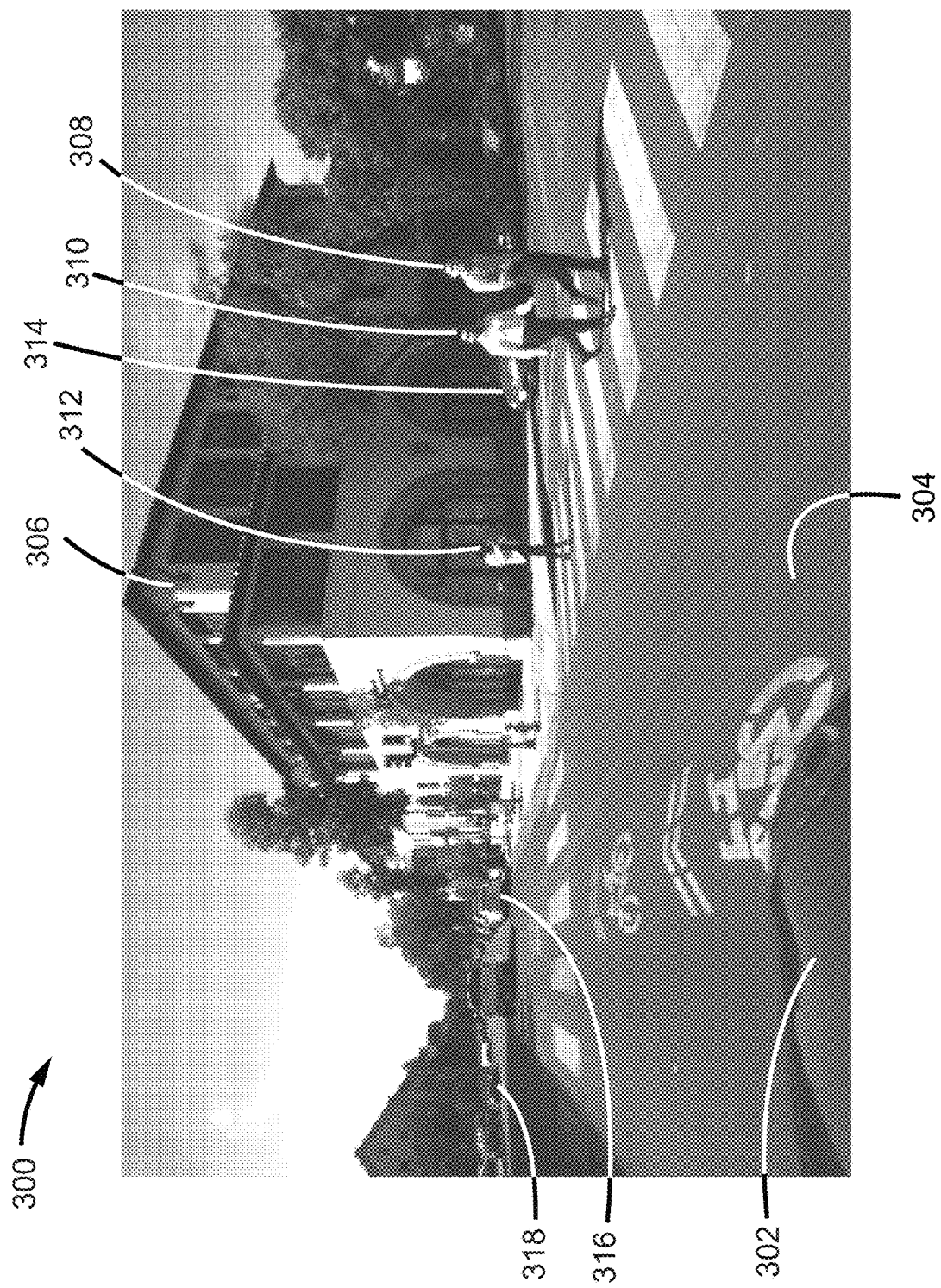
FIG. 3 illustrates an example of an image captured for localization and mapping according to one aspect of the present disclosure.
Figure 4:
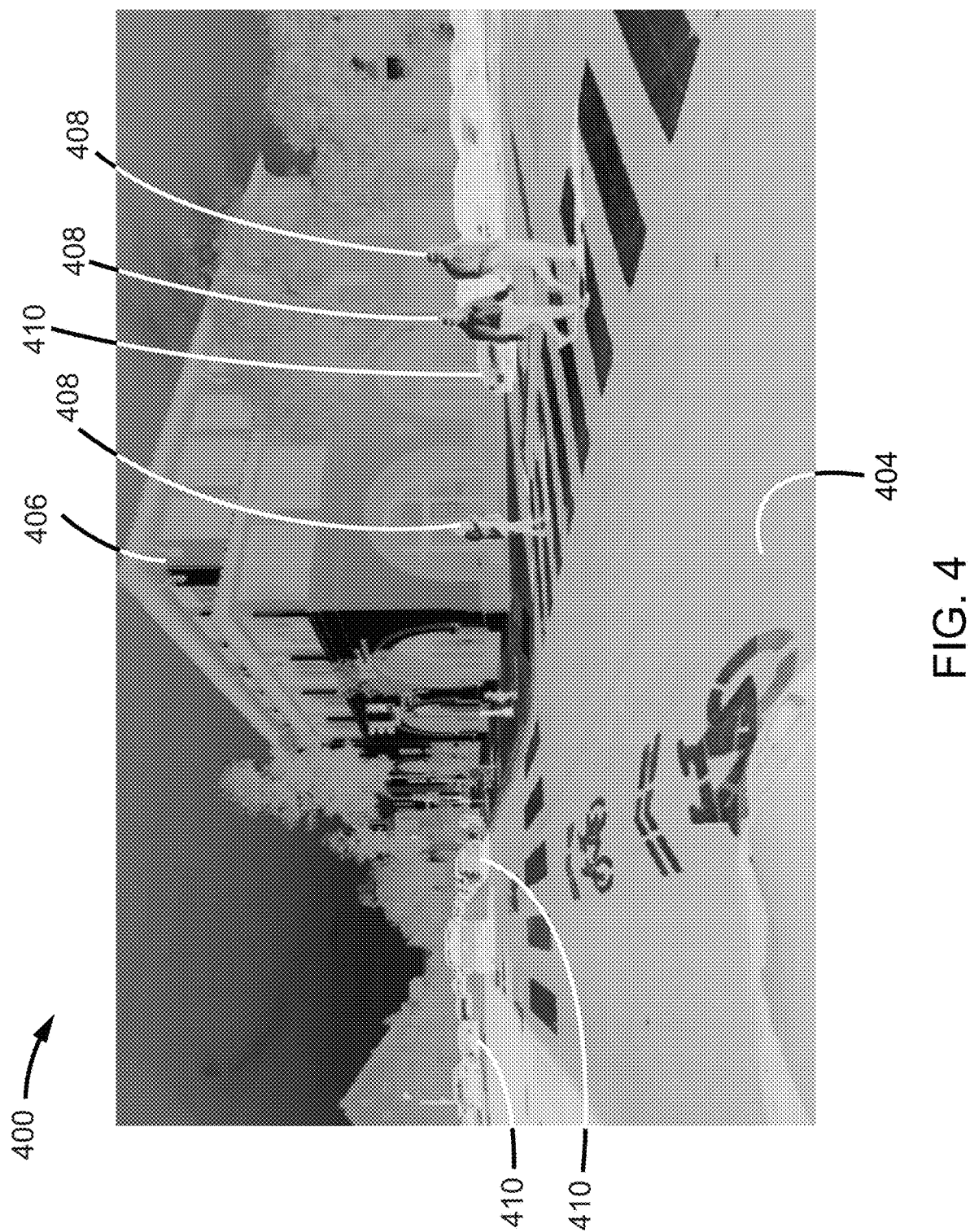
FIG. 4 illustrates an example of a semantic predicted image created from the image of FIG. 3 according to one aspect of the disclosure.

FIGS. 3-8 illustrate examples of images and/or scans in accordance with aspects described above. FIG. 3 illustrates an example of an image 300 captured by a camera 110, where the camera 110 may be mounted on a vehicle 302 traveling a route. The image 300 depicts a scene captured by the camera 110 along the route, and the scene may be associated with a location (e.g., a location of vehicle 302 when the image 300 is captured), as described above. The image 300 includes a street 304, various buildings 306 along the street 304, a plurality of people 308, 310, 312 walking on or nearby the street 304, and a plurality of vehicles 314, 316, 318 parked and/or traveling along the street 304. This image 300 may be an example of an image provided to the localization and mapping component 106. FIG. 4 illustrates an example of a semantic predicted image 400 generated from the image 300. For example, the 3D detection component 120 may detect the street 304 in the image 300, and modify pixel values of pixels identified as the street 304 to be of one color, to yield street 404 in the semantic predicted image 400. Similarly, the 3D detection component 120 may detect the buildings 306 in image 300, and modify pixel values of pixels identified as the buildings 306 to be of one color, to yield buildings 406 in the semantic predicted image 400. Further, the 3D detection component 120 may detect the people 308, 310, 312 in image 300, and modify pixel values of pixels identified as the people 308, 310, 312 to be of one color, to yield people 408 in the semantic predicted image 400. Moreover, for example, the 3D detection component 120 may detect the vehicles 314, 316, 318 in image 300, and modify pixel values of pixels identified as a vehicle to be of one color, to yield vehicles 410 in the semantic predicted image 400. As described, objects identified in the same semantic class (e.g., vehicle) may be modified to be of the same color and therefore include the same label.

Figure 5:
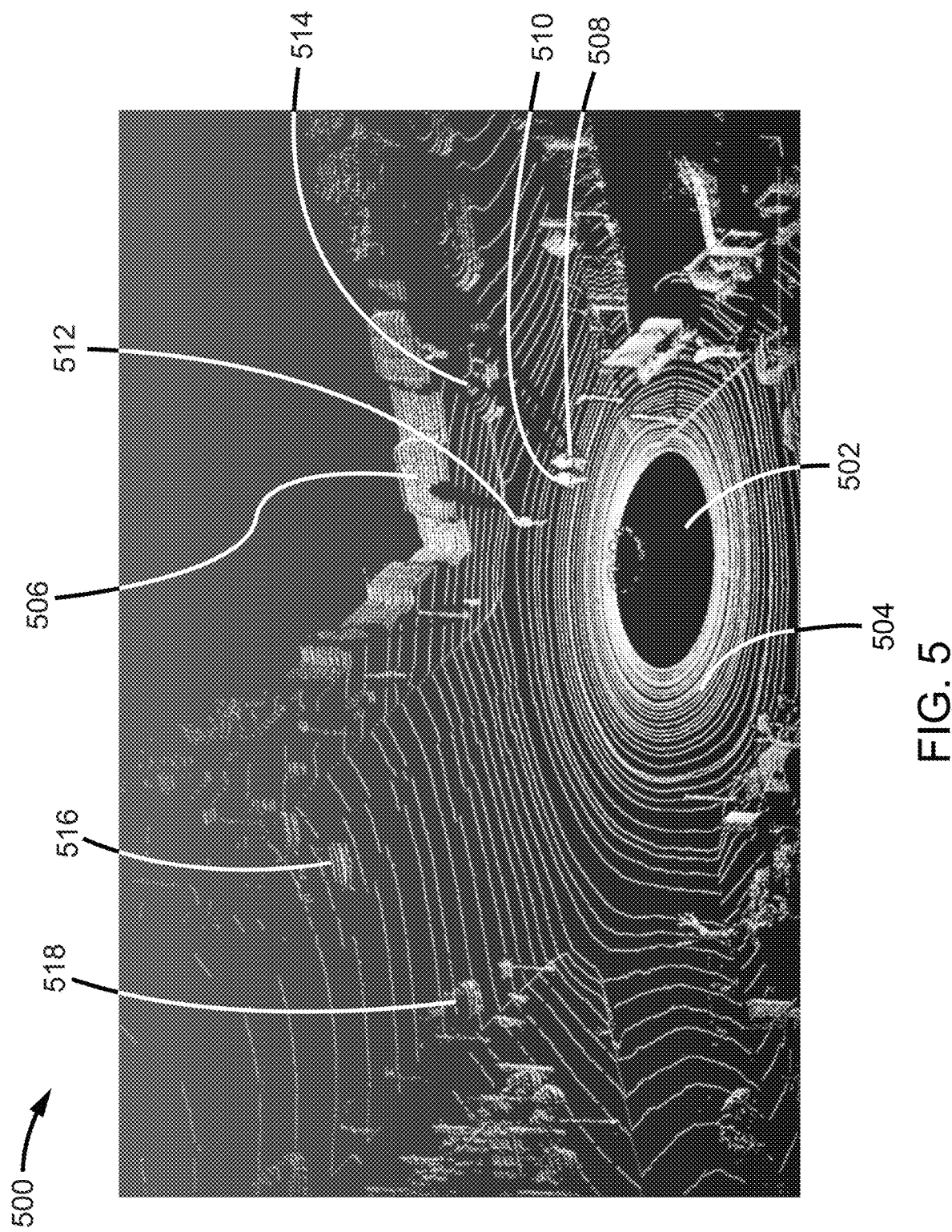
FIG. 5 illustrates an example of a point cloud captured for localization and mapping according to one aspect of the present disclosure.

FIG. 5 illustrates an example of a point cloud 500 obtained from a LIDAR 114, which may also be mounted on the vehicle 502 traveling the route. The point cloud 500 depicts a LIDAR scan captured by the LIDAR 114 along the route, and may also be associated with the location of the image 300 based on a time at which the image 300 and point cloud 500 are captured, a location of the vehicle 502 when the point cloud 500 is captured, etc. The point cloud 500 includes a plurality of points that define a street 504 (which may be the street 304 in the image 300), one or more buildings 506 (which may be the building 306 in the image 300), a plurality of people 508, 510, 512 (which may be the plurality of people 308-312 in the image 300), and a plurality of vehicles 514, 516, 518 (which may be one or more of the vehicles 314-318 in the image 300). The point cloud 500 may be provided to the localization and mapping component 106 as well.

Figure 6:
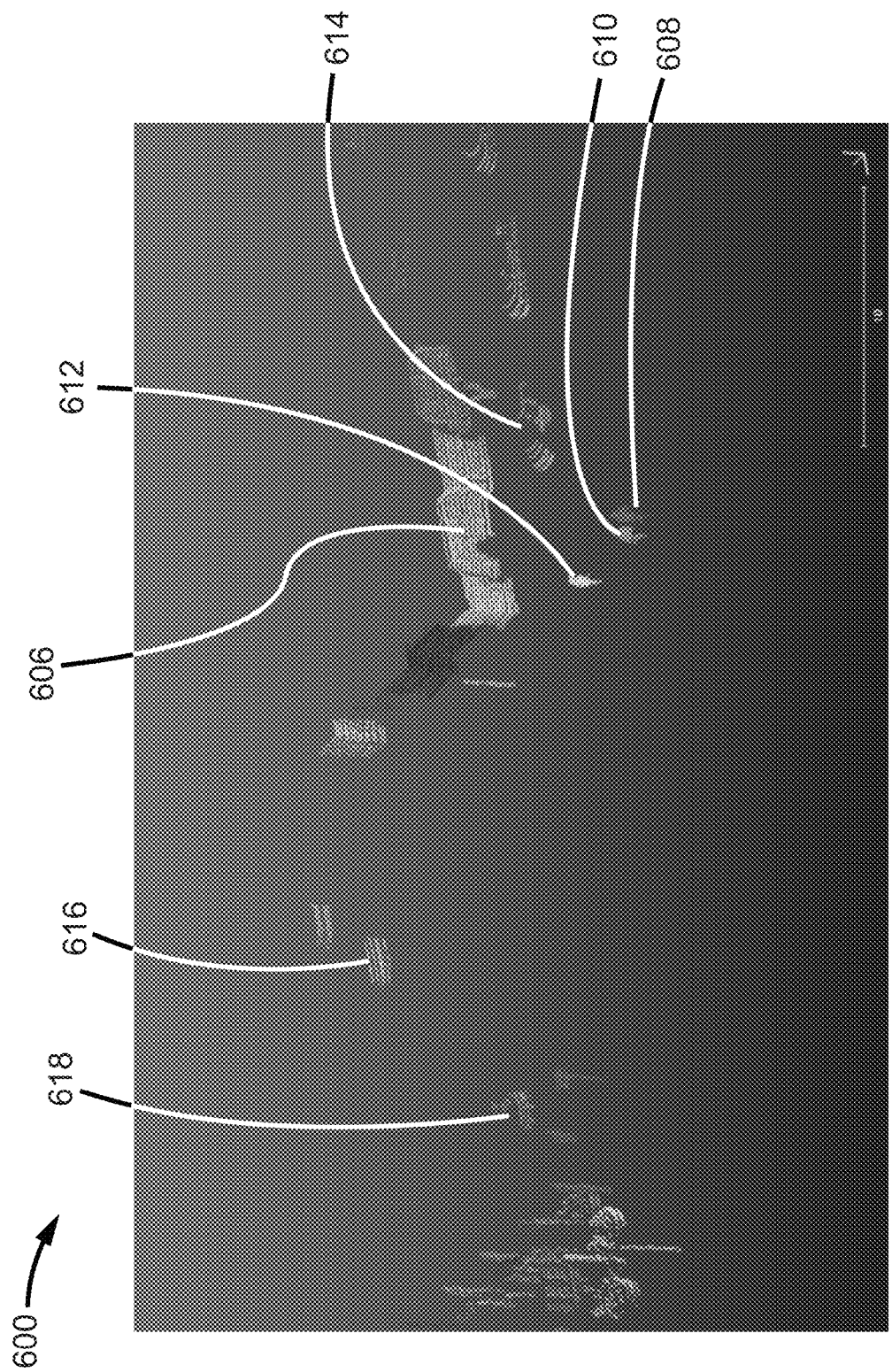
FIG. 6 illustrates an example of a point cloud having clustering and ground removal created from the point cloud of FIG. 5 according to one aspect of the present disclosure.

FIG. 6 illustrates an example of a point cloud 600 having object clustering performed and ground removal. In an aspect, the 3D detection component 120 may determine object clusters based on the one or more methods described above. For example, the 3D detection component 120 may cluster the street 504 (not shown in FIG. 6), the building 606 (which may be the building 506 of the point cloud 500), the people 608, 610, 612 (which may be the plurality of people 508-512 of the point cloud 500), and the vehicles 614, 616, 618 (which may be the plurality of vehicles 514-518 of the point cloud 500). The 3D detection component 120 may remove ground from the point cloud 600 by determining, for example, the ground is the largest planar component in the point cloud 600.

Figure 7:
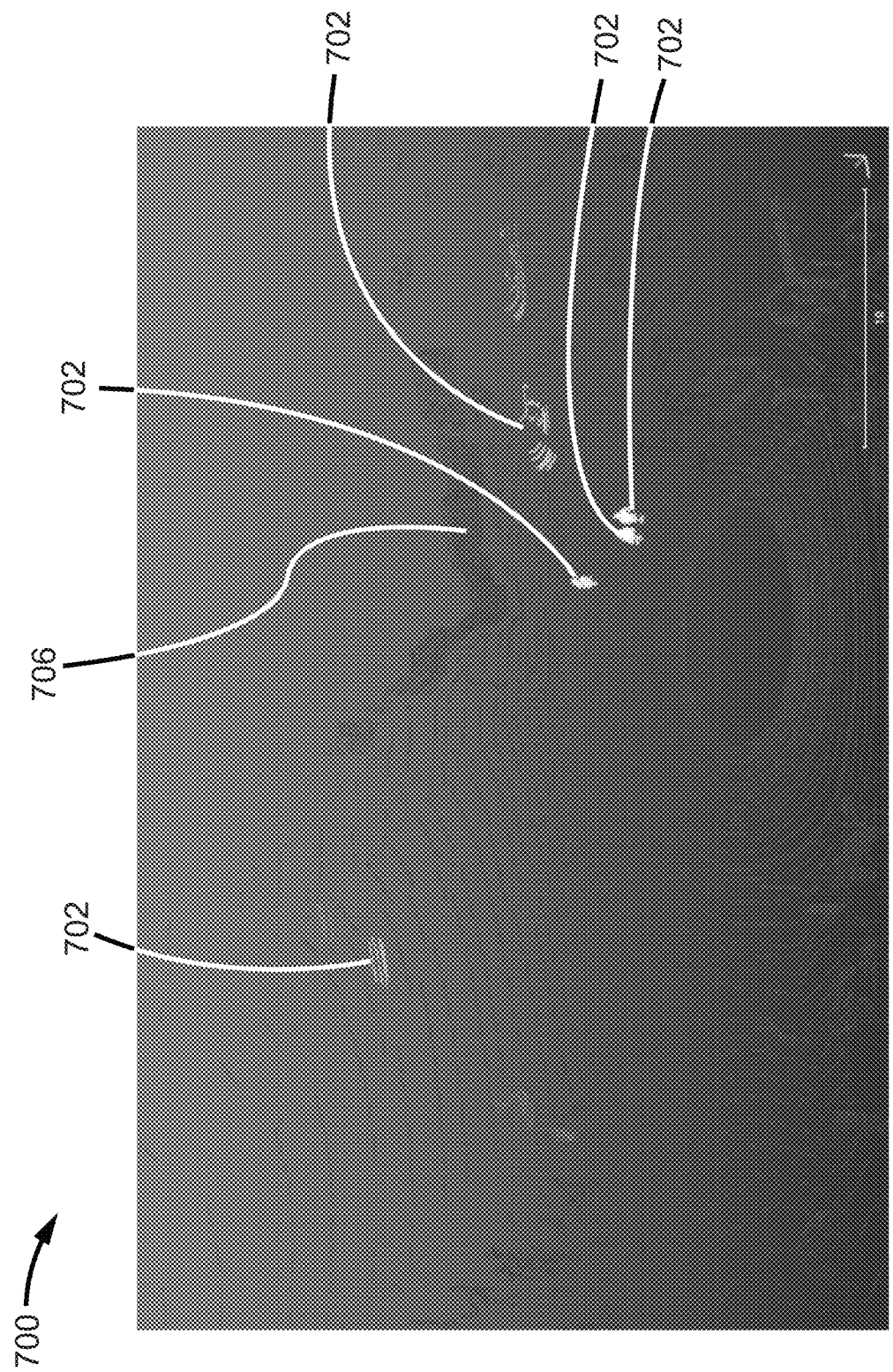
FIG. 7 illustrates an example of a labeled point cloud created from the point cloud of FIG. 5 according to one aspect of the present disclosure.

FIG. 7 illustrates an example of a point cloud 700 where the labels of the image 400 have been transferred to the point cloud 600 with clustering having been performed and ground removed. In an aspect, the 3D detection component 120 may associate the labels of the image 400 with the points of the point cloud 600 and may determine dynamic traffic participants based on the labels. As shown by FIG. 7, the people 608-612 (which may be the people 508-512 of the point cloud 500) of the point cloud 600 are determined to be associated with the labeled people 408 of FIG. 4 and the vehicles 614-618 (which may be the vehicles 514-518 of the point cloud 500) of the point cloud 600 are determined to be associated with the labeled vehicles 410 of FIG. 4 and therefore are determined to be dynamic traffic participants 702. However, the building 706 (which may be the building 506 of the point cloud 500) of the point cloud 700 are determined to be associated with the labeled building 406 of FIG. 4 and is therefore determined to not be a dynamic traffic participant.

Figure 8:
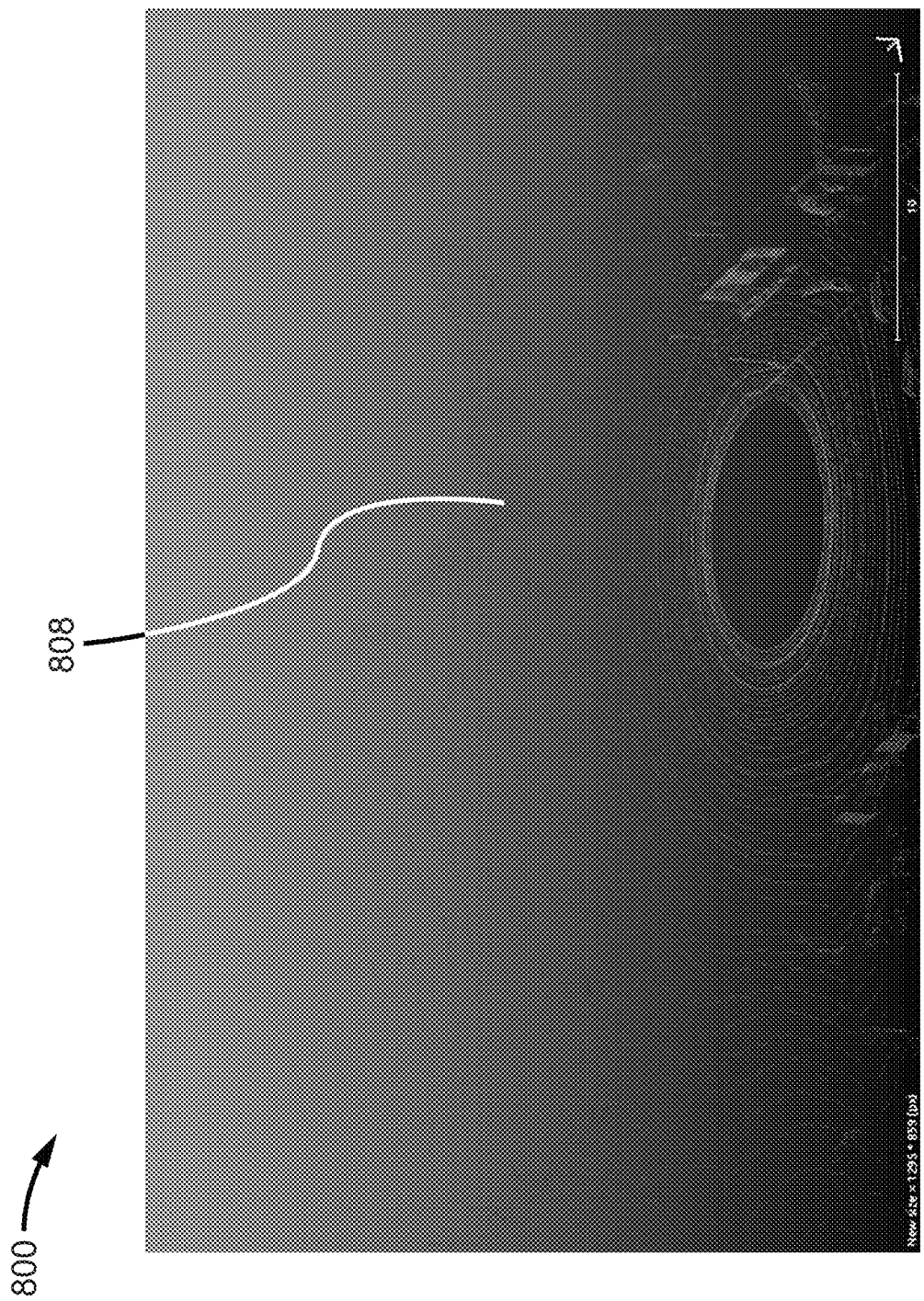
FIG. 8 illustrates an example of a point cloud with removed dynamic traffic participants created from the labeled point cloud of FIG. 7 according to one aspect of the present disclosure

FIG. 8 illustrates an example of a point cloud 800 having the dynamic traffic participants removed. In an aspect, the dynamic traffic participant removal component 122 may remove dynamic traffic participants, based on the labeled point cloud. In an example, dynamic traffic participants may include the people 508-512 and the vehicles 514-518. In comparison with FIG. 5, FIG. 8 does not include the people 508-512 and the vehicles 514-518 as the dynamic traffic participants have been removed from the point cloud 800. However, as shown by FIG. 8 the building 808 (which may be the building 506 of the point cloud 500) remains in the point cloud 800. Once dynamic traffic participants have been removed, the SLAM component may perform a SLAM operation, as described above, using data from the point cloud 800 having removed dynamic traffic participants.

Figure 9:
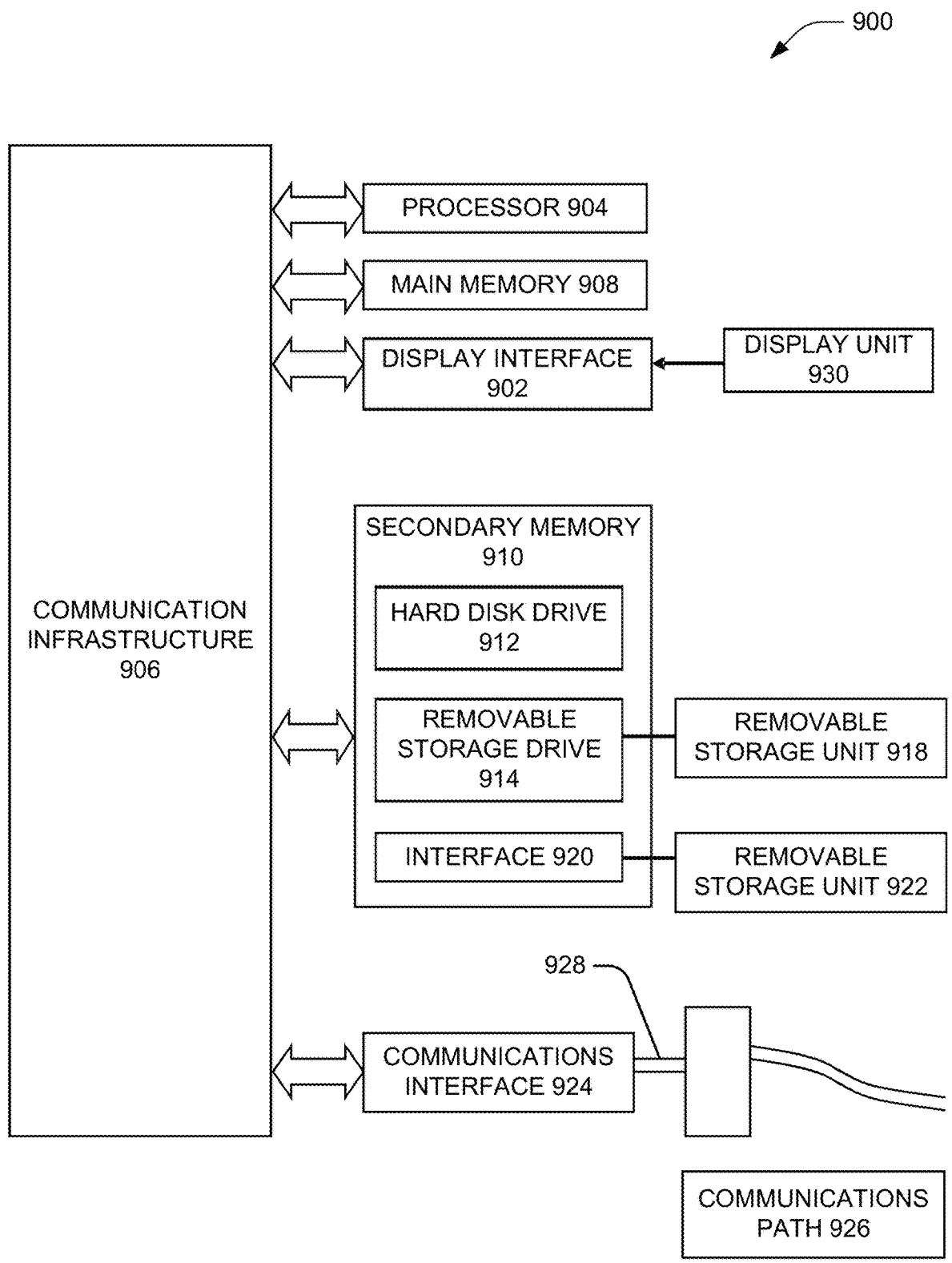
FIG. 9 illustrates an example system diagram of various hardware components and other features for use in accordance with aspects of the present disclosure.

Aspects of the present disclosure may be implemented using hardware, software, or a combination thereof and may be implemented in one or more computer systems or other processing systems. In one variation, aspects of the disclosure are directed toward one or more computer systems capable of carrying out the functionality described herein. An example of such a computer system 900 is shown in FIG. 9.

Computer system 900 includes one or more processors, such as processor 904. The processor 904 is connected to a communication infrastructure 906 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 900 may include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc., which is read by and written to removable storage drive 914. As will be appreciated, the removable storage unit 918 includes a computer usable storage medium having stored therein computer software and/or data.

In alternative aspects, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928, which may be electronic, electromagnetic, optical or other signals capable of being received by communications interface 924. These signals 928 are provided to communications interface 924 via a communications path (e.g., channel) 926. This path 926 carries signals 928 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 914, a hard disk installed in hard disk drive 912, and signals 928. These computer program products provide software to the computer system 900. Aspects of the disclosure are directed to such computer program products.

Computer programs (also referred to as computer control logic) are stored in main memory 908 and/or secondary memory 910. Computer programs may also be received via communications interface 924. Such computer programs, when executed, enable the computer system 900 to perform various features in accordance with aspects of the present disclosure, as discussed herein. In particular, the computer programs, when executed, enable the processor 904 to perform such features. Accordingly, such computer programs represent controllers of the computer system 900. Computer programs may include localization and mapping component 106, image component 108 for receiving images from one or more cameras 110, point cloud component 112 for receiving point clouds, location component 116 for determining location of one or more entities associated with the processor 904, etc., as described herein.

In variations where aspects of the disclosure are implemented using software, the software may be stored in a computer program product and loaded into computer system 900 using removable storage drive 914, hard drive 912, or communications interface 920. The control logic (software), when executed by the processor 904, causes the processor 904 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another variation, aspects of the disclosure are implemented using a combination of both hardware and software.

Figure 10:
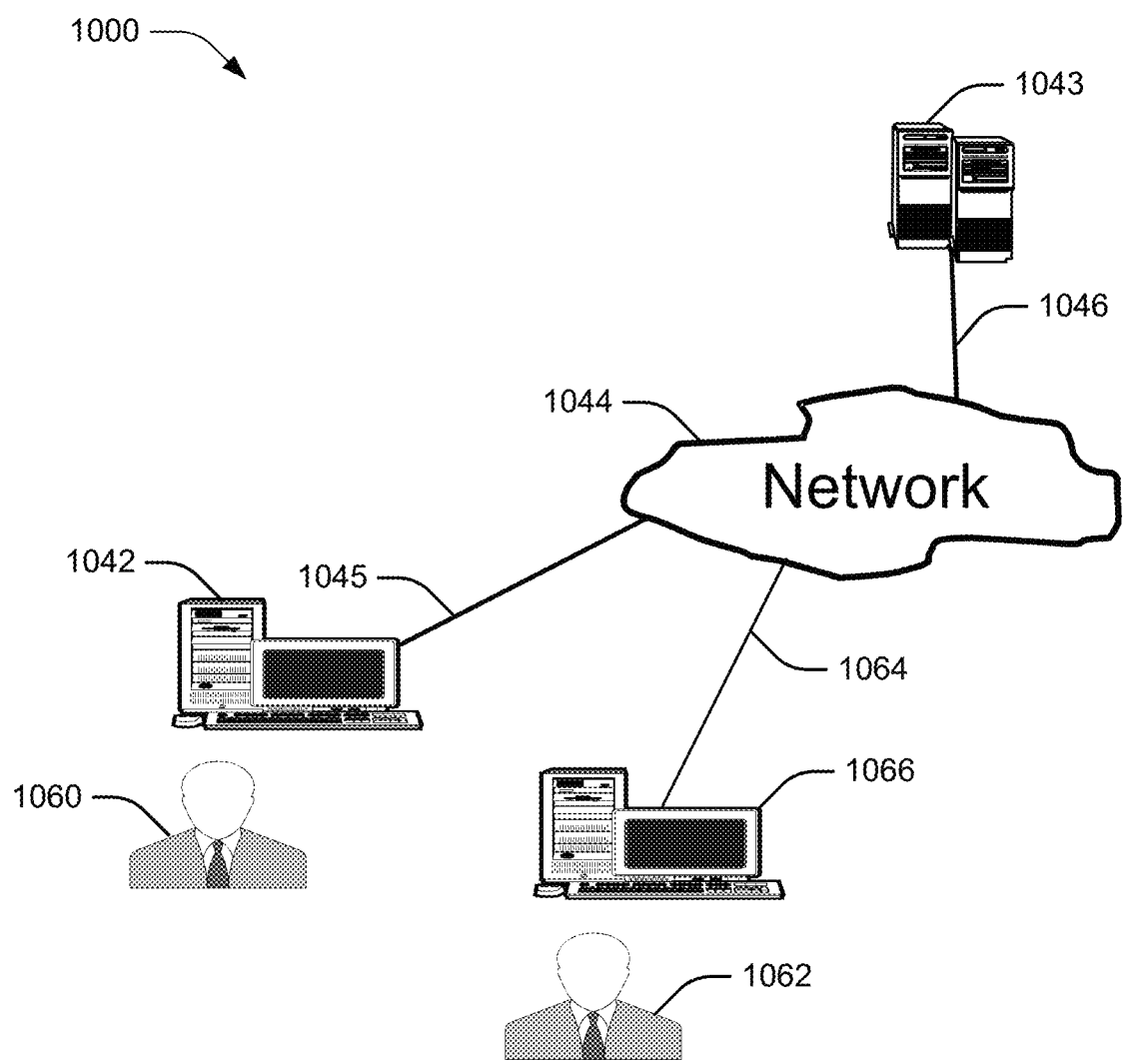
FIG. 10 is a block diagram of various example system components for use in accordance with aspects of the present disclosure.

FIG. 10 is a block diagram of various example system components that may be used in accordance with aspects of the present disclosure. For example, the various components may be within the vehicle 102, or only some of the components may be within the vehicle 102, and other components may be remote from the vehicle 102. The system 1000 includes one or more accessors 1060, 1062 (also referred to interchangeably herein as one or more "users") and one or more terminals 1042, 1066 (such terminals may be or include, for example, various features of the object detection system 110). In one aspect, data for use in accordance with aspects of the present disclosure is, for example, input and/or accessed by accessors 1060, 1062 via terminals 1042, 1066, such as personal computers (PCs), minicomputers, mainframe computers, microcomputers, telephonic devices, or wireless devices, such as personal digital assistants ("PDAs") or a hand-held wireless devices coupled to a server 1043, such as a PC, minicomputer, mainframe computer, microcomputer, or other device having a processor and a repository for data and/or connection to a repository for data, via, for example, a network 1044, such as the Internet or an intranet, and couplings 1045, 1046, 1064. The couplings 1045, 1046, 1064 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method for localization and mapping for an autonomous vehicle, comprising:
   obtaining, via a camera, an image acquired at a first location;
   assigning labels to one or more objects of the image;
   obtaining, via a light detector, a point cloud acquired at a second location, which is within a threshold distance of the first location;
   determining one or more object clusters of the point cloud;
   associating the labels assigned to the one or more objects of the image with points of the object clusters of the point cloud; and
   identifying three-dimensional (3D) objects of the point cloud based on the labels associated with the points of the object clusters.

2. The method of claim 1, further comprising:
   removing dynamic traffic participants from the point cloud based on the identified 3D objects.

3. The method of claim 2, further comprising:
   performing a simultaneous localization and mapping operation on the point cloud after the dynamic traffic participants are removed from the point cloud.

4. The method of claim 1, wherein the assigning labels to the one or more objects of the image includes performing semantic segmentation to the image on a per pixel basis.

5. The method of claim 4, wherein the associating the labels includes associating labels of at least a portion of pixels of the image to corresponding points of the point cloud.

6. The method of claim 1, wherein the assigning labels to one or more objects of the image includes identifying the dynamic traffic participants within the image.

7. The method of claim 1, wherein the determining one or more object clusters of the point cloud includes identifying a ground plane of the point cloud and removing the ground plane from the point cloud.

8. A system for localization and mapping for an autonomous vehicle, comprising:
a camera for capturing one or more images;
a light detector for capturing one or more point clouds;
a memory coupled to the camera and the light detector for storing the one or more images and the one or more point clouds; and
one or more processors coupled to the memory, wherein the one or more processors is configured to:
obtain, via the camera, an image acquired at a first location;
assign labels to one or more objects of the image;
obtain, via the light detector, a point cloud acquired at a second location, which is within a threshold distance of the first location;
determine one or more object clusters of the point cloud;
associate the labels assigned to the one or more objects of the image with points of the object clusters of the point cloud; and
identify three-dimensional (3D) objects of the point cloud based on the labels associated with the points of the object clusters.

9. The system of claim 8, wherein the one or more processors is further configured to:
remove dynamic traffic participants from the point cloud based on the identified 3D objects.

10. The system of claim 9, wherein the one or more processors is further configured to:
perform a simultaneous localization and mapping operation on the point cloud after the dynamic traffic participants are removed from the point cloud.

11. The system of claim 8, wherein the one or more processors is further configured to:
perform semantic segmentation to the image on a per pixel basis.

12. The system of claim 11, wherein the one or more processors is further configured to:
associate labels of at least a portion of pixels of the image to corresponding points of the point cloud.

13. The system of claim 8, wherein the one or more processors is further configured to:
identify the dynamic traffic participants within the image.

14. The system of claim 8, wherein the one or more processors is further configured to:
identify a ground plane of the point cloud; and
remove the ground plane from the point cloud.

15. A non-transitory computer-readable medium storing computer executable code for one or more processors to perform localization and mapping for an autonomous vehicle, comprising code for:
obtaining, via a camera, an image acquired at a first location;
assigning labels to one or more objects of the image;
obtaining, via a light detector, a point cloud acquired at a second location, which is within a threshold distance of the first location;
determining one or more object clusters of the point cloud;
associating the labels assigned to the one or more objects of the image with points of the object clusters of the point cloud; and
identifying three-dimensional (3D) objects of the point cloud based on the labels associated with the points of the object clusters.

16. The non-transitory computer-readable medium of claim 15, further comprising code for:
removing dynamic traffic participants from the point cloud based on the identified 3D objects.

17. The non-transitory computer-readable medium of claim 16, further comprising code for:
performing a simultaneous localization and mapping operation on the point cloud after the dynamic traffic participants are removed from the point cloud.

18. The non-transitory computer-readable medium of claim 15, wherein the code for assigning labels to the one or more objects of the image includes code for performing semantic segmentation to the image on a per pixel basis.

19. The non-transitory computer-readable medium of claim 18, wherein the code for associating the labels includes code for associating labels of at least a portion of pixels of the image to corresponding points of the point cloud.

20. The non-transitory computer-readable medium of claim 15, wherein the code for assigning labels to one or more objects of the image includes code identifying the dynamic traffic participants within the image.

* * * * *